(12) United States Patent
Hori et al.

(10) Patent No.: US 11,788,688 B2
(45) Date of Patent: *Oct. 17, 2023

(54) PRESSURE TESTING METHOD AND PRESSURE TESTER

(71) Applicant: TOYOTA JIDOSHA KABUSHIKI KAISHA, Toyota (JP)

(72) Inventors: Yoshihiro Hori, Nisshin (JP); Takayoshi Doi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

This patent is subject to a terminal disclaimer.

(21) Appl. No.: 17/217,478

(22) Filed: Mar. 30, 2021

(65) Prior Publication Data

US 2021/0301981 A1 Sep. 30, 2021

(30) Foreign Application Priority Data

Mar. 31, 2020 (JP) .................................. 2020-064297

(51) Int. Cl.
*G01N 29/14* (2006.01)
*F17C 13/02* (2006.01)
*G01N 29/44* (2006.01)

(52) U.S. Cl.
CPC .......... *F17C 13/025* (2013.01); *G01N 29/14* (2013.01); *G01N 29/4454* (2013.01);
(Continued)

(58) Field of Classification Search
CPC ............ F17C 13/025; F17C 2201/0109; F17C 2201/056; F17C 2201/058;
(Continued)

(56) References Cited

U.S. PATENT DOCUMENTS

2008/0302186 A1* 12/2008 Bohse ................ G01N 29/4427
73/587
2010/0001851 A1 1/2010 Handa
(Continued)

FOREIGN PATENT DOCUMENTS

JP 2003066015 A 3/2003
JP 2010014624 A 1/2010
(Continued)

*Primary Examiner* — Suman K Nath
(74) *Attorney, Agent, or Firm* — Hunton Andrews Kurth LLP

(57) ABSTRACT

A pressure testing method capable of determining with a higher accuracy whether a high-pressure tank is deteriorated. The pressure testing method tests the high-pressure tank that includes a liner and a fiber-reinforced resin layer covering the outer surface of the liner and that has been used while repeating charge and discharge of gas to and from the inside thereof after undergoing a pressure resistance test conducted at a pressure resistance test pressure. The method increases the internal pressure of the high-pressure tank filled with gas to a test pressure that is lower than the pressure resistance test pressure, so that a plurality of AE waveforms is extracted from output waveforms of an AE sensor that detects AE waves generated in the high-pressure tank, and determines whether the high-pressure tank is deteriorated, on the basis of the extracted AE waveforms.

6 Claims, 10 Drawing Sheets

(52) U.S. Cl.
CPC ............... *F17C 2201/0109* (2013.01); *F17C 2203/0604* (2013.01); *F17C 2203/0619* (2013.01); *F17C 2203/0673* (2013.01); *F17C 2221/012* (2013.01); *F17C 2223/035* (2013.01); *F17C 2250/043* (2013.01); *F17C 2250/0694* (2013.01); *G01N 2291/2695* (2013.01)

(58) Field of Classification Search
CPC ...... F17C 2203/0604; F17C 2203/0619; F17C 2203/0673; F17C 2203/0636; F17C 2203/066; F17C 2203/0663; F17C 2221/012; F17C 2223/035; F17C 2223/0123; F17C 2223/036; F17C 2250/043; F17C 2250/0694; F17C 2205/0305; F17C 2205/0397; F17C 2270/0168; F17C 2270/0184; G01N 29/14; G01N 29/4454; G01N 29/4445; G01N 29/46; G01N 29/227; G01N 29/069; G01N 2291/2695; G01N 2291/023; G01N 2291/0231; G01N 3/02; G01N 3/06; G01N 3/12; Y02E 60/32
See application file for complete search history.

(56) References Cited

U.S. PATENT DOCUMENTS

2010/0107765 A1\* 5/2010 Murakami ........... G01N 29/043
73/587
2017/0104227 A1 4/2017 Otsubo

FOREIGN PATENT DOCUMENTS

| | | | |
|---|---|---|---|
| JP | 2011102700 | A | 5/2011 |
| JP | 2015031630 | A | 2/2015 |
| JP | 2017072244 | A | 4/2017 |
| WO | 2009008515 | A1 | 1/2009 |
| WO | 2014057987 | A1 | 4/2014 |

\* cited by examiner

| | Images (scalograms) | Classification |
|---|---|---|
| 1 |  | Second image (Microcrack) |
| 2 |  | Second image (Microcrack) |
| 3 |  | First image (Macrocrack) |
| 4 |  | First image (Macrocrack) |
| . . . | . . . | . . . |

PRESSURE TESTING METHOD AND PRESSURE TESTER

CROSS REFERENCE TO RELATED APPLICATIONS

The present application claims priority from Japanese patent application JP 2020-064297 filed on Mar. 31, 2020, the entire content of which is hereby incorporated by reference into this application.

BACKGROUND

Technical Field

The present disclosure relates to a pressure testing method and a pressure tester for a high-pressure tank including a liner and a fiber-reinforced resin layer covering the outer surface of the liner.

Background Art

Conventionally known testing methods for a liquid-containing tank include a method based on an AE (acoustic emission) technique (see, for example, JP 2011-102700 A). The testing method described in JP 2011-102700 A acquires an AE detection curve of a site to be tested over time and determines generation of fatigue cracks and crack developments on the basis of the counted number of AEs in specific frequency bands corresponding to the AEs generated due to the internal crack developments in the AE detection curve.

SUMMARY

A high-pressure tank including a liner and a fiber-reinforced resin layer covering the outer surface of the liner undergoes a pressure resistance test after the manufacturing (before shipping). The pressure resistance test increases the internal pressure of the high-pressure tank up to 1.5 times higher than the upper limit in the normal range. The high-pressure tank that has passed the pressure resistance test is mounted on a vehicle or the like for use. The high-pressure tank repeats charge and discharge of gas to and from the inside thereof while being used. The high-pressure tank that has passed the pressure resistance test is re-tested for vehicle inspection or the like after the elapse of a given warranty period. Such re-testing is conducted for the outer appearance and gas leakage check.

The re-testing method for a high-pressure tank desirably detects with a higher accuracy whether the high-pressure tank is deteriorated. The testing method described in JP 2011-102700 A does not test a tank with its internal pressure increased to a pressure higher than the pressure while being used. Such a method is unable to accurately determine whether the tank is deteriorated.

In view of these points, the present disclosure provides a pressure testing method and a pressure tester that are capable of determining with a higher accuracy whether a high-pressure tank is deteriorated.

A pressure testing method according to the present disclosure tests a high-pressure tank that includes a liner and a fiber-reinforced resin layer covering the outer surface of the liner and that has been used while repeating charge and discharge of gas to and from the inside thereof after undergoing a pressure resistance test conducted at a pressure resistance test pressure. The method increases the internal pressure of the high-pressure tank filled with gas to a test pressure that is lower than the pressure resistance test pressure, so that a plurality of AE waveforms is extracted from output waveforms of an AE sensor that detects AE waves generated when cracks occur in the high-pressure tank, and determines whether the high-pressure tank is deteriorated, on the basis of the extracted AE waveforms.

In the present specification and claims, AE is an abbreviation for acoustic emission, and refers to a phenomenon in which energy is released as elastic waves when a material or a structure is broken or deformed. AE waves are elastic waves released when a material or a structure is broken or deformed. An AE sensor is a sensor that detects elastic waves (AE waves) generated with AE.

According to a pressure testing method of the present disclosure, the internal pressure of the high-pressure tank is increased to a test pressure that is lower than the pressure resistance test pressure at the time of the pressure resistance test, so that a plurality of AE waveforms is extracted from output waveforms of the AE sensor that detects AE waves generated in the high-pressure tank, and whether the high-pressure tank is deteriorated is determined on the basis of the extracted AE waveforms. The pressure resistance test conducted by increasing the internal pressure of the high-pressure tank causes cracks in the fiber-reinforced resin layer, and the cracks trigger AE waves. When the internal pressure of the high-pressure tank is increased to the test pressure that is lower than the pressure resistance test pressure afterwards, few cracks and AE waves normally appear in the fiber-reinforced resin layer. Therefore, in the pressure testing method of the present disclosure, the internal pressure of the high-pressure tank, which has once been increased to the pressure resistance test pressure, is increased to the test pressure that is lower than the pressure resistance test pressure, and if AE waves are generated, the AE sensor detects the AE waves and a plurality of AE waveforms is extracted from the output waveforms of the AE sensor, thereby facilitating the determination whether the high-pressure tank is deteriorated based on the extracted AE waveforms. As a result, whether to replace the high-pressure tank can be easily recognized.

In some embodiments, the pressure testing method classifies the plurality of extracted AE waveforms into first waveforms derived from macrocracks that increase immediately before destruction of the high-pressure tank and second waveforms derived from microcracks smaller than the macrocracks with a classifier that is machine-learned so as to classify the plurality of extracted AE waveforms into the first waveforms and the second waveforms, and determines whether the high-pressure tank is deteriorated, on the basis of the number of the first waveforms classified. This configuration enables the determination whether the high-pressure tank is deteriorated based on the number of the first waveforms derived from macrocracks that increase immediately before destruction of the high-pressure tank. Thus, whether the high-pressure tank is deteriorated can be more accurately determined.

In this case, in some embodiments, the extracted plurality of AE waveforms are wavelet-transformed to create a plurality of images, and the plurality of images corresponding to the plurality of AE waveforms is classified into first images corresponding to the first waveforms and second images corresponding to the second waveforms with the classifier that is machine-learned so as to classify the plurality of images into the first images and the second images, and whether the high-pressure tank is deteriorated is determined on the basis on the number of the first images classified. The wavelet transformation of the extracted AE waveforms creates images (scalograms) indicative of a temporal change in the frequency components. The classification of the plurality of created images by the classifier enables easy classification of the images into the first and second images, which facilitates the determination whether the high-pressure tank is deteriorated.

In some embodiments, the pressure testing method determines that the high-pressure tank is deteriorated when the cumulative number of the AE waveforms reaches or exceeds a threshold. Pressurization of a deteriorated high-pressure tank triggers a larger number of cracks in the fiber-reinforced resin layer, and the AE waveforms extracted from the output waveforms of the AE sensor increase accordingly. When the cumulative number of the AE waveforms reaches or exceeds a given value (threshold), the high-pressure tank is more likely to be deteriorated. Thus, whether the high-pressure tank is deteriorated can be more accurately determined using the cumulative number of the AE waveforms.

A pressure tester according to the present disclosure tests a high-pressure tank that includes a liner and a fiber-reinforced resin layer covering the outer surface of the liner and that has been used while repeating charge and discharge of gas to and from the inside thereof after undergoing the pressure resistance test conducted at a pressure resistance test pressure. The pressure tester includes a calculation device having an extractor that extracts a plurality of AE waveforms from output waveforms of the AE sensor that detects AE waves generated when cracks occur in the high-pressure tank by increasing the internal pressure of the high-pressure tank filled with gas to a test pressure that is lower than the pressure resistance test pressure, and a determination unit that determines whether the high-pressure tank is deteriorated, on the basis of the AE waveforms extracted by the extractor.

According to the pressure tester of the present disclosure, the internal pressure of the high-pressure tank is increased to a test pressure that is lower than the pressure resistance test pressure at the time of the pressure resistance test, so that a plurality of AE waveforms is extracted from output waveforms of the AE sensor that detects AE waves generated in the high-pressure tank, and whether the high-pressure tank is deteriorated is determined on the basis of the extracted AE waveforms. The pressure resistance test conducted by increasing the internal pressure of the high-pressure tank causes cracks in the fiber-reinforced resin layer, and the cracks trigger AE waves. When the internal pressure of the high-pressure tank is increased to the test pressure that is lower than the pressure resistance test pressure afterwards, few cracks and AE waves normally appear in the fiber-reinforced resin layer. Therefore, in the pressure tester of the present disclosure, the internal pressure of the high-pressure tank, which has once been increased to the pressure resistance test pressure, is increased to the test pressure that is lower than the pressure resistance test pressure, and if AE waves are generated, the AE sensor detects the AE waves and a plurality of AE waveforms is extracted from the output waveforms of the AE sensor, thereby facilitating the determination whether the high-pressure tank is deteriorated based on the extracted AE waveforms. As a result, whether to replace the high-pressure tank can be easily recognized.

In some embodiments, the calculation device of the pressure tester includes the classifier that is machine-learned so as to classify the plurality of AE waveforms extracted by the extractor into the first waveforms derived from macrocracks that increase immediately before destruction of the high-pressure tank and the second waveforms derived from microcracks smaller than the macrocracks, and the determination unit determines whether the high-pressure tank is deteriorated, on the basis of the number of the first waveforms classified by the classifier. This configuration enables the determination whether the high-pressure tank is deteriorated based on the number of the first waveforms derived from macrocracks that increase immediately before destruction of the high-pressure tank. Thus, whether the high-pressure tank is deteriorated can be more accurately determined.

In this case, in some embodiments, the calculation device includes a converter configured to wavelet-transform the plurality of AE waveforms extracted by the extractor to create a plurality of images. The classifier is machine-learned so as to classify the plurality of images corresponding to the plurality of AE waveforms into the first images corresponding to the first waveforms and the second images corresponding to the second waveforms, and the determination unit determines whether the high-pressure tank is deteriorated, on the basis of the number of the first images classified by the classifier. The wavelet transformation of the extracted AE waveforms creates images (scalograms) indicative of a temporal change in the frequency components. The classification of the plurality of created images by the classifier enables easy classification of the images into the first and second images, which facilitates the determination whether the high-pressure tank is deteriorated.

In some embodiments, the determination unit of the pressure tester determines that the high-pressure tank is deteriorated when the cumulative number of the AE waveforms reaches or exceeds a threshold. Pressurization of a deteriorated high-pressure tank triggers a larger number of cracks in the fiber-reinforced resin layer, and the AE waveforms extracted from the output waveforms of the AE sensor increase accordingly. When the cumulative number of the AE waveforms reaches or exceeds a given value (threshold), the high-pressure tank is more likely to be deteriorated. Thus, whether the high-pressure tank is deteriorated can be more accurately determined using the cumulative number of the AE waveforms.

The present disclosure provides a pressure testing method and a pressure tester capable of more accurately determining whether a high-pressure tank is deteriorated.

DETAILED DESCRIPTION

First Embodiment

Figure 1:
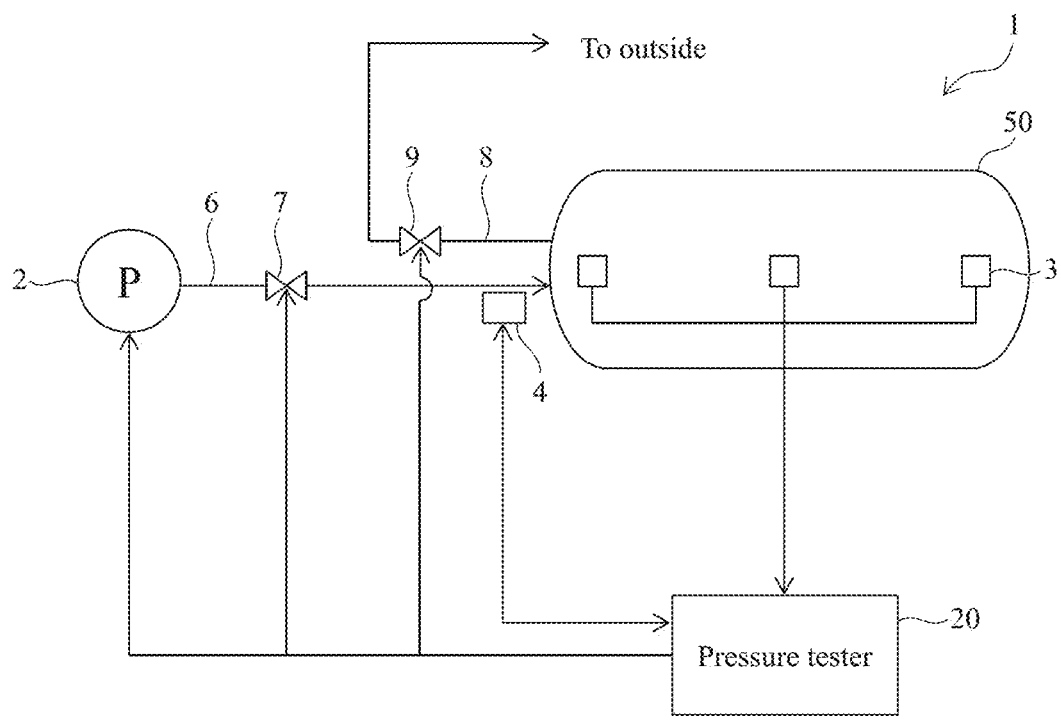
FIG. 1 is a schematic view showing the overall configuration of a test system including a pressure tester according to a first embodiment of the present disclosure.

Referring to the drawings, the following describes a test system 1 including a pressure tester 20 according to a first embodiment of the present disclosure. FIG. 1 is a schematic view showing the overall configuration of the test system 1 including the pressure tester 20 according to the first embodiment of the present disclosure.

As shown in FIG. 1, the test system 1 tests a high-pressure tank 50. The high-pressure tank 50 is, for example, a tank to be mounted on a fuel cell vehicle and filled with a high-pressure hydrogen gas. The gas that can be filled in the high-pressure tank 50 is not limited to a hydrogen gas. The high-pressure tank 50 undergoes a pressure resistance test after the manufacturing (before shipping). The high-pressure tank 50 that has passed the pressure resistance test is mounted on a vehicle. The test system 1 tests the high-pressure tank 50 either being mounted on or temporarily removed from a vehicle for vehicle inspection or the like.

The test system 1 includes: a pump 2 that pressurizes the inside of the high-pressure tank 50; one or more AE sensors 3 mounted on the outer surface of the high-pressure tank 50; a pressure sensor 4 that detects the internal pressure of the high-pressure tank 50; and a pressure tester 20 that controls the drive of the pump 2 and determines whether the high-pressure tank 50 is deteriorated. This test system 1 is placed in a testing room formed with a thick concrete wall, for example. "AE" means "acoustic emission" in this specification.

The pump 2 is to fill the inside of the high-pressure tank 50 with gas (nitrogen in this example) to pressurize the inside of the high-pressure tank 50. The pump 2 feeds nitrogen contained in a nitrogen tank (not shown) to the high-pressure tank 50. The gas to be fed to the high-pressure tank 50 is not limited to nitrogen, but for example, helium, air, or a mixed gas of helium and nitrogen may be used.

The pump 2 connects to a feed pipe 6 made of metal, for example, through which gas fed to the high-pressure tank 50 passes. The feed pipe 6 comes with a valve 7 capable of opening and closing the flow channel. The high-pressure tank 50 connects to an exhaust pipe 8 made of metal, for example. The exhaust pipe 8 exhausts the gas inside the high-pressure tank 50 to the outside of the testing room. The exhaust pipe 8 comes with a valve 9 capable of opening and closing the flow channel.

The AE sensor 3 detects AE waves generated due to the occurrence of a crack in a fiber-reinforced resin layer 52 described later of the high-pressure tank 50, and outputs the detection result as an output waveform to the pressure tester 20. The AE sensor 3 is not particularly limited as long as it can detect the AE waves generated in the high-pressure tank 50, and may be a piezoelectric sensor, for example.

The AE sensor 3 is fixed at a predetermined position on the outer surface of the fiber-reinforced resin layer 52. The number and fixing positions of the AE sensors 3 are not particularly limited, and in this example, the AE sensors 3 are fixed at three positions in total, including both ends and the center of the high-pressure tank 50 in the axial direction (longitudinal direction). This configuration of the AE sensors 3 enables the detection of AE waves, no matter where the AE waves are generated in the high-pressure tank 50. Even if two or more AE sensors 3 detect a single AE wave, a known technique can determine that the detected waves are identical based on the waveforms. This means that the number of AEs generated is not counted duplicately.

In the present embodiment, the high-pressure tank 50 is filled with gas (nitrogen in this example), and so the AE waves (vibration) generated in response to AE in the high-pressure tank 50 propagate through the fiber-reinforced resin layer 52 to be detected by the AE sensor 3.

The pressure sensor 4 is configured to be capable of detecting the internal pressure of the high-pressure tank 50. The pressure sensor 4 may be placed inside the high-pressure tank 50, or may be placed at the feed pipe 6 connecting the pump 2 and the high-pressure tank 50. The pressure sensor 4 outputs the detection result to the pressure tester 20.

Figure 2:
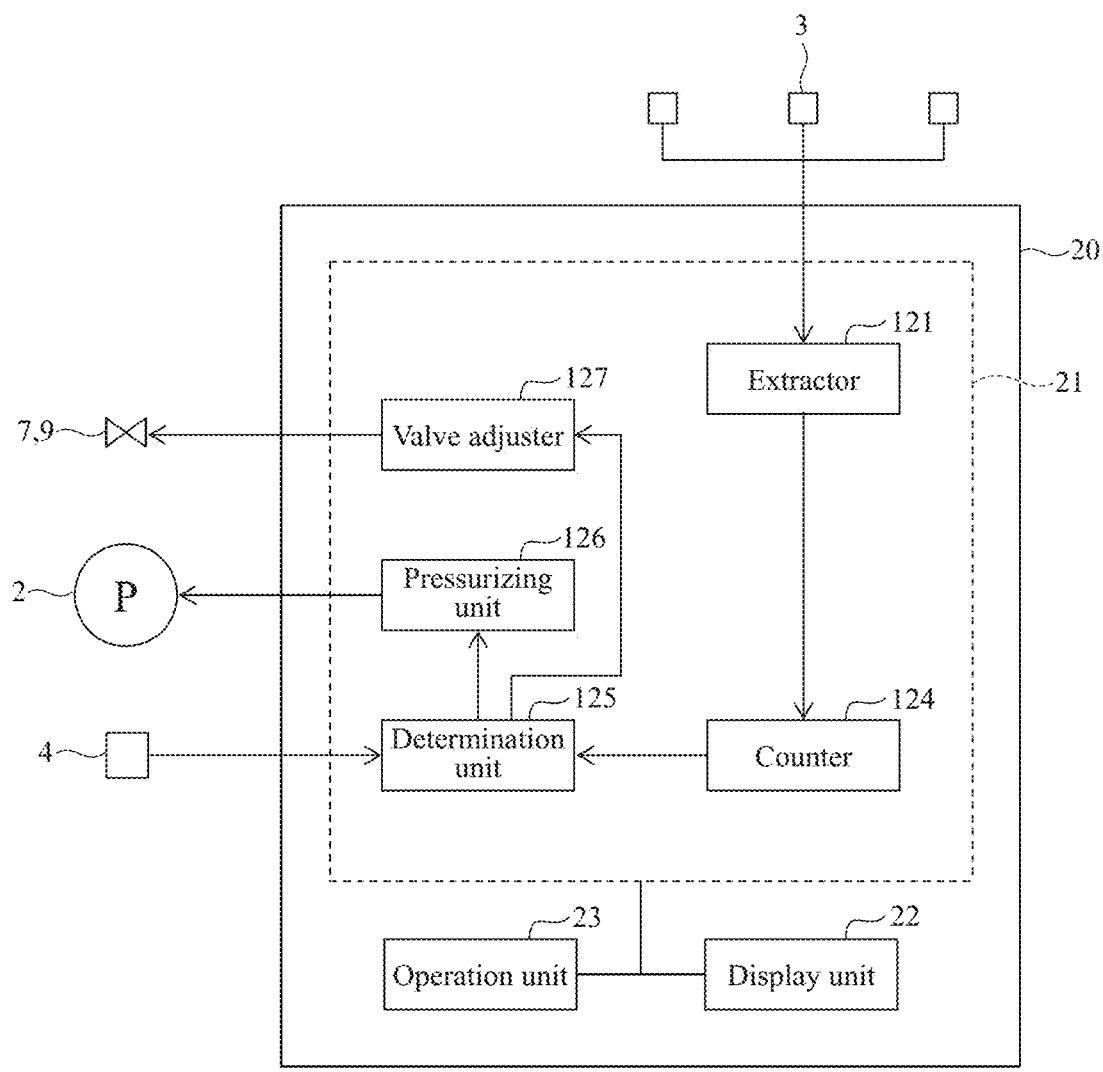
FIG. 2 is a block diagram showing the configuration of a controller of the pressure tester according to the first embodiment of the present disclosure.

The pressure tester 20 is configured to test the high-pressure tank 50 about whether or not an abnormality occurs when the inside of the high-pressure tank 50 increases to a predetermined pressure. As shown in FIG. 2, the pressure tester 20 includes: a controller 21 that controls the pump 2 and the like, a display unit 22 including a display panel; and an operating unit 23 including buttons operated by an operator. In one example, the display unit 22 is configured to display information, such as the internal pressure of the high-pressure tank 50, the pressurizing time, the output waveforms of the AE sensor 3, the operating status of the pump 2, the operating status of the valves 7 and 9, and the outputs of an extractor 121, a counter 124 and a determination unit 125, which are described later.

The pressure tester 20 is capable of controlling the drive and the stop of the pump 2, and in particular, is capable of stopping the pump 2 based on the output of the AE sensor 3. The pressure tester 20 also controls the opening/closing operation of the valves 7 and 9. The detailed structure of the pressure tester 20 will be described later.

Figure 3:
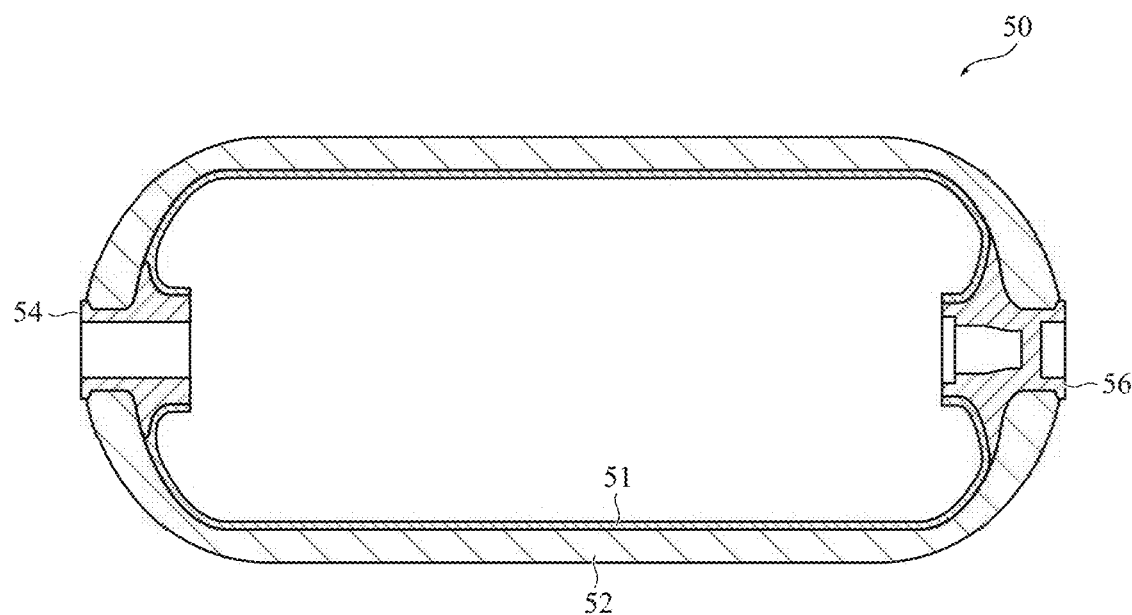
FIG. 3 is a cross-sectional view showing the structure of a high-pressure tank shown in FIG. 1.

As shown in FIG. 3, the high-pressure tank 50 is a substantially cylindrical high-pressure gas storage vessel with both ends rounded like a dome shape. The high-pressure tank 50 includes a liner 51 having a gas barrier property, and the fiber-reinforced resin layer 52 made of a fiber-reinforced resin covering the outer surface of the liner 51.

The liner 51 is made of resin or metal, and defines a storage space to be filled with a high-pressure hydrogen gas. The liner 51 has openings at both ends in the longitudinal direction (axial direction), and the openings come with a cap 54 and an end boss 56. The cap 54 and the end boss 56 are prepared by machining a metal material, such as aluminum or an aluminum alloy, into a predetermined shape. The cap 54 connects to the feed pipe 6 and the exhaust pipe 8 to feed and exhaust a hydrogen gas to and from the storage space.

The fiber-reinforced resin layer 52 covers the outer surface of the liner 51 and has a function of reinforcing the liner 51 to enhance the mechanical strength such as rigidity and pressure resistance of the high-pressure tank 50. The fiber-reinforced resin layer 52 includes thermosetting resin and reinforcement fibers. In some embodiments, examples of the thermosetting resin include phenol resins, melamine resins, urea resins, and epoxy resins. In some embodiments, the thermosetting resin is an epoxy resin from the viewpoint of mechanical strength, for example. Examples of the reinforcement fibers include glass fibers, aramid fibers, boron fibers, and carbon fibers. In some embodiments, the reinforcement fibers are carbon fibers from the viewpoints of light weight and mechanical strength, for example.

Next, the detailed structure of the pressure tester 20 is described below.

As shown in FIG. 2, the controller 21 of the pressure tester 20 includes a CPU and a memory unit including a ROM and a RAM. The CPU executes operation programs stored in the memory unit.

The controller 21 includes, as software, the extractor 121, the counter 124, the determination unit 125, a pressurizing unit 126, and a valve adjuster 127. In the present embodiment, the extractor 121, the counter 124, and the determination unit 125 constitute the "calculation device" of the present disclosure.

Figure 4:
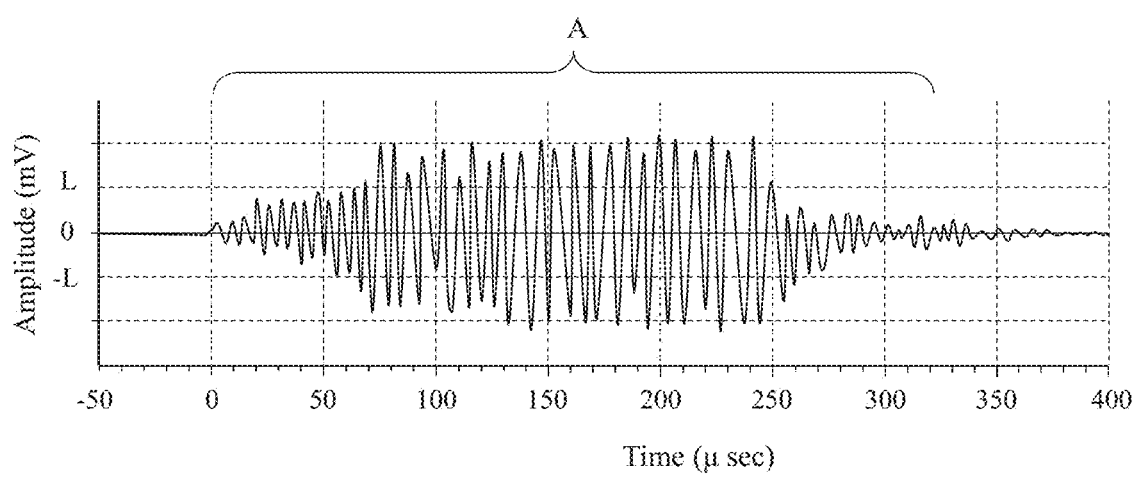
FIG. 4 shows an output waveform of an AE sensor when a high-pressure tank filled with gas is pressurized.

The extractor 121 receives the output waveform of the AE sensor 3. The extractor 121 extracts a plurality of AE waveforms from the output waveforms of the AE sensor 3. Specifically, the output waveforms of the AE sensor 3 include the combination of a large number of waveforms as shown in FIG. 4, for example. In the waveform shown in FIG. 4, region A represents the vibration that propagates through the fiber-reinforced resin layer 52 when AE occurs in the high-pressure tank 50.

At a timing when the amplitude becomes equal to or greater than a predetermined amplitude (L) after AEs occur in the high-pressure tank 50, the extractor 121 extracts a mass of vibrations (region A) within a certain period including the timing as one AE waveform. The threshold is set for noise removal. When a predetermined time elapses after the amplitude becomes equal to or greater than the predetermined amplitude, the vibration becomes smaller and so the amplitude becomes less than the predetermined amplitude. After extracting the AE waveform, the extractor 121 extracts the next AE waveform when the amplitude reaches equal to or greater than the predetermined amplitude again after the elapse of a certain period of time. In this way, the extractor 121 sequentially extracts a plurality of AE waveforms from the output waveforms of the AE sensor 3 and outputs them to the counter 124.

These AE waveforms derived from the plurality of AEs are occasionally connected to be output as one large (long in the time axis) AE waveform, but such AE waveforms account for less than a few percentage of all the AE waveforms, and so it hardly affects the counted number of AE waveforms, that is, the test result for the high-pressure tank 50.

The counter 124 counts the number of the AE waveforms extracted by the extractor 121 and outputs the number to the determination unit 125.

The determination unit 125 determines whether the high-pressure tank 50 is deteriorated, on the basis of the number of the AE waveforms. In the present embodiment, the determination unit 125 determines whether the cumulative number of the AE waveforms is equal to or greater than the first threshold. Note that the first threshold is an example of the "threshold" of the present disclosure. The method for determining the first threshold will be described later.

When the cumulative number of the AE waveforms is equal to or greater than the first threshold, the determination unit 125 determines that the high-pressure tank 50 is deteriorated and rejects it. At this time, the determination unit 125 outputs a stop signal to stop the pressurization of the high-pressure tank 50 to the pressurizing unit 126. The determination unit 125 also outputs a valve driving signal to close the valve 7 and open the valve 9 to the valve adjuster 127.

When the cumulative number of the AE waveforms is less than the first threshold, the determination unit 125 does not output the stop signal or valve driving signal. Thus, the pressurization of the high-pressure tank 50, that is, the testing of the high-pressure tank 50 is continued.

The determination unit 125 detects the internal pressure of the high-pressure tank 50 on the basis of a pressure signal from the pressure sensor 4. When the internal pressure of the high-pressure tank 50 reaches the upper limit of the test pressure, the determination unit 125 determines that the high-pressure tank 50 is not deteriorated and accepts it. At this time, the determination unit 125 outputs the stop signal and the valve driving signal to the pressurizing unit 126 and the valve adjuster 127, respectively.

Receiving the stop signal from the determination unit 125, the pressurizing unit 126 stops driving the pump 2.

Receiving the valve driving signal from the determination unit 125, the valve adjuster 127 closes the valve 7 and opens the valve 9.

Next, a method for determining the first threshold is described below.

Figure 5:
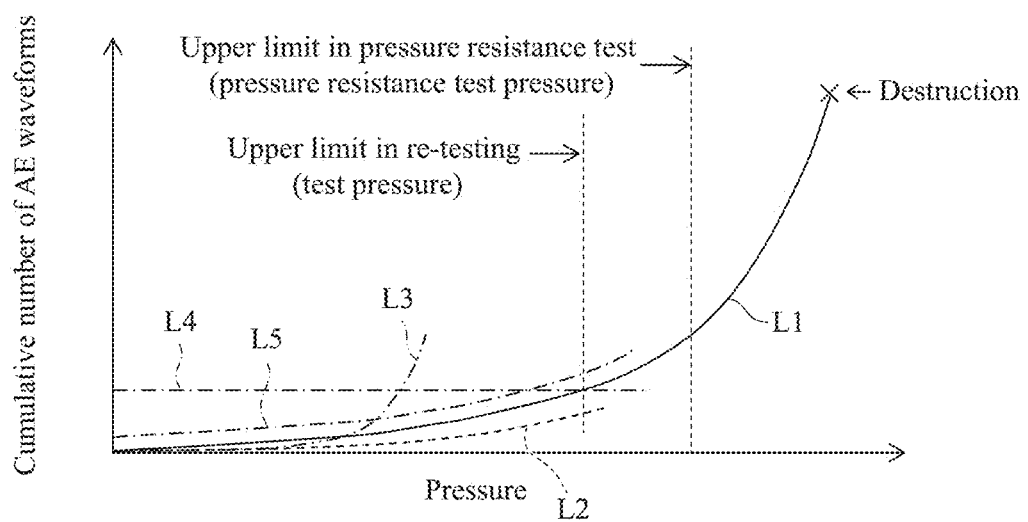
FIG. 5 shows the cumulative number of AE waveforms when a high-pressure tank is pressurized.

As indicated by the solid line L1 in FIG. 5, when the internal pressure of the high-pressure tank 50 that is unpressurized (before undergoing the pressure resistance test) is increased until the high-pressure tank 50 breaks, the number of the AEs (the number of the AE waveforms) generated in the high-pressure tank 50 also increases. The number of the AE waveforms gradually increases as the internal pressure of the high-pressure tank 50 increases. This number increases sharply immediately before the destruction of the high-pressure tank 50.

When the internal pressure of the high-pressure tank 50 after undergoing the pressure resistance test is increased to a pressure that is lower than the upper limit (pressure resistance test pressure) of the pressure at the time of the pressure resistance test, few cracks and AE waves are normally generated in the fiber-reinforced resin layer. Therefore, when the internal pressure of the high-pressure tank 50 is increased to a pressure that is lower than the pressure at the time of the pressure resistance test, the cumulative number of the AE waveforms does not exceed the solid line L1, as indicated by the dotted line L2 in FIG. 5. On the other hand, when the internal pressure of the high-pressure tank 50 is increased to a pressure that is lower than the pressure at the time of the pressure resistance test, if the cumulative number of the AE waveforms exceeds the solid line L1 (at the time of the pressure resistance test) as indicated by the two-dot chain line L3 in FIG. 5, this is an indication of the occurrence of abnormality in the high-pressure tank 50, which enables easy determination whether the high-pressure tank 50 is deteriorated. The first threshold as a reference for the determination may be a constant value as indicated by the reference line L4 in FIG. 5 or a value slightly greater than the cumulative number (solid line L1 in FIG. 5) at the time of the pressure resistance test as indicated by the reference line L5. The first threshold is set by measuring the cumulative numbers of AE waveforms of a plurality of high-pressure tanks 50 until their destruction (solid line L1 in FIG. 5) while considering the variations.

Next, a pressure testing method for the high-pressure tank 50 using the pressure tester 20 is described below. This pressure testing method tests the high-pressure tank 50 that has been used while repeating charge and discharge of gas to and from the inside thereof, and is conducted, for example, for vehicle inspection. The pressure testing method pressurizes the internal pressure of the high-pressure tank 50 to the upper limit in the normal range (for example, 70 MPa) or a test pressure slightly higher than the upper limit in the normal range (for example, 80 MPa), without reaching the upper limit at the time of the pressure resistance test (pressure resistance test pressure).

Figure 6:
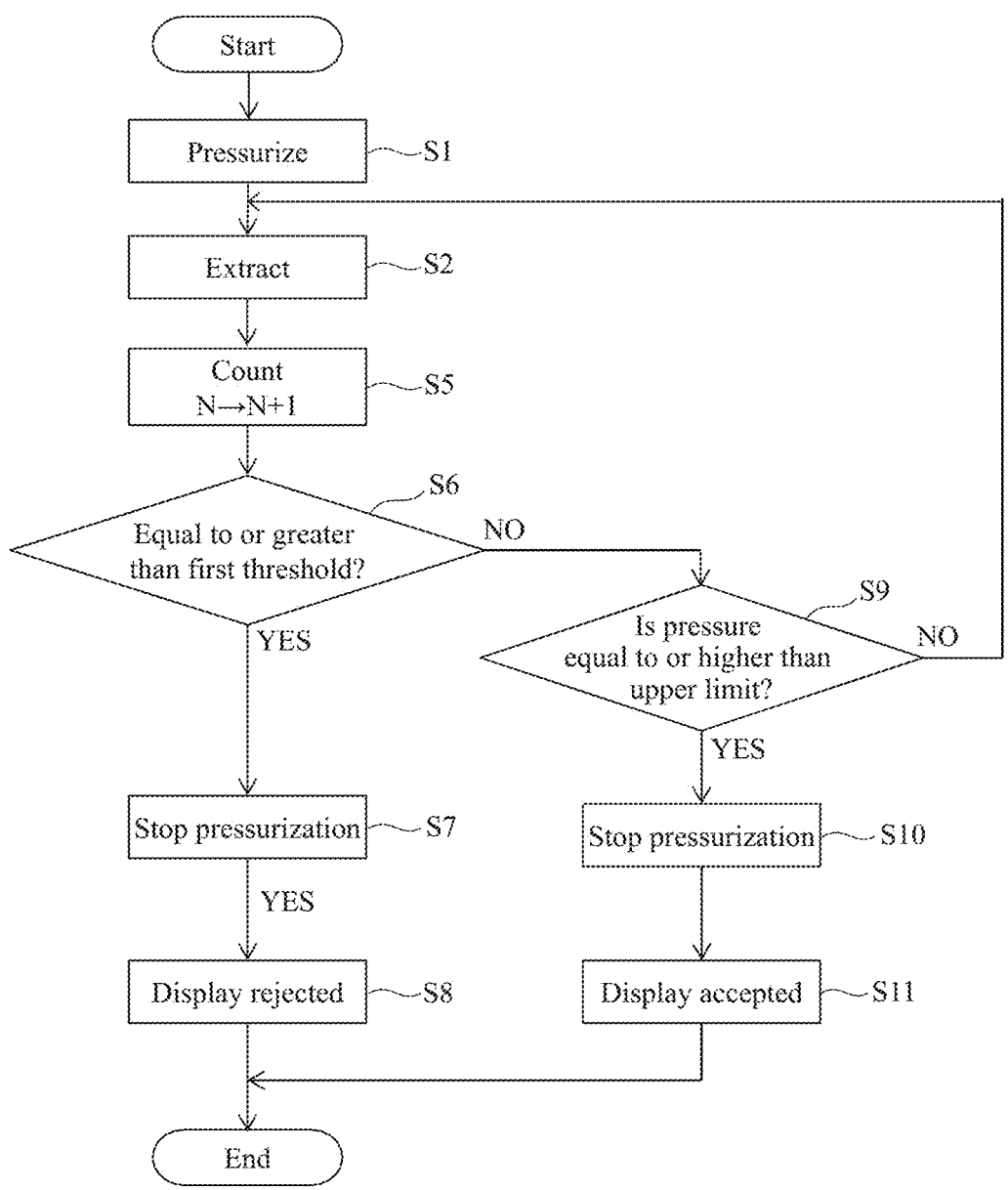
FIG. 6 is a flowchart of a pressure testing method according to the first embodiment of the present disclosure.

As shown in FIG. 6, at step S1, the operator operates the operation unit 23 of the pressure tester 20 to cause the pressure tester 20 to increase the pressure inside the high-pressure tank 50. At this step, the valve 7 is open and the valve 9 is closed. The internal pressure of the high-pressure tank 50 is increased at a substantially constant rate.

At step S2, when cracks occur in the fiber-reinforced resin layer 52 as the internal pressure of the high-pressure tank 50 increases, the AE sensor 3 outputs waveforms including AE waveforms to the extractor 121. The extractor 121 sequentially extracts the AE waveforms from the output waveforms of the AE sensor 3 and outputs them to the counter 124.

At step S5, the counter 124 counts (adds 1 to N) the number of the AE waveforms that are sequentially input from the extractor 121. The counter 124 outputs the counted number of the AE waveforms to the determination unit 125.

At step S6, the determination unit 125 determines whether the cumulative number of the AE waveforms is equal to or greater than the first threshold.

When the cumulative number of the AE waveforms is equal to or greater than the first threshold, i.e., when the high-pressure tank 50 is in a state of deterioration, the determination unit 125 outputs a stop signal to stop the pressurization of the high-pressure tank 50 and a valve driving signal to the pressurizing unit 126 and the valve adjuster 127, respectively. Then, the procedure proceeds to step S7.

At step S7, the pressurizing unit 126 stops the pump 2. This stops the pressurization of the high-pressure tank 50. The valve adjuster 127 closes the valve 7 and opens the valve 9. This stops the feeding of gas to the high-pressure tank 50, and exhausts gas in the high-pressure tank 50 to the outside through the exhaust pipe 8. As a result, the internal pressure of the high-pressure tank 50 decreases.

Then, at step S8, the display unit 22 displays (notifies) that the high-pressure tank 50 has failed the test.

Meanwhile, at step S6, when the cumulative number of the AE waveforms is less than the first threshold, i.e., the high-pressure tank 50 is not in a state of deterioration, the procedure proceeds to step S9.

At step S9, the determination unit 125 determines, on the basis of the output of the pressure sensor 4, whether the internal pressure of the high-pressure tank 50 is equal to or higher than the upper limit of the test pressure. When the internal pressure of the high-pressure tank 50 is lower than the upper limit of the test pressure, the procedure returns to step S2. On the other hand, when the internal pressure of the high-pressure tank 50 is equal to or higher than the upper limit of the test pressure, the determination unit 125 outputs a stop signal and a valve driving signal to the pressurizing unit 126 and the valve adjuster 127, respectively, and the procedure proceeds to step S10.

At step S10, the pressurizing unit 126 stops the pump 2. This stops the pressurization of the high-pressure tank 50. The valve adjuster 127 closes the valve 7 and opens the valve 9. This stops the feeding of gas to the high-pressure tank 50, and exhausts gas in the high-pressure tank 50 to the outside through the exhaust pipe 8. As a result, the internal pressure of the high-pressure tank 50 decreases.

At step S11, the display unit 22 displays (notifies) that the high-pressure tank 50 has passed the test.

Then, the pressure test for the high-pressure tank 50 ends.

As described above, in the present embodiment, the internal pressure of the high-pressure tank 50 is increased to a test pressure that is lower than the pressure resistance test pressure at the time of the pressure resistance test, so that a plurality of AE waveforms is extracted from output waveforms of the AE sensor 3 that detects AE waves generated in the high-pressure tank 50, and whether the high-pressure tank 50 is deteriorated is determined on the basis of the extracted AE waveforms. The pressure resistance test conducted by increasing the internal pressure of the high-pressure tank 50 causes cracks in the fiber-reinforced resin layer 52, and the cracks trigger AE waves. When the internal pressure of the high-pressure tank 50 is increased to the test pressure that is lower than the pressure resistance test pressure afterwards, few cracks and AE waves normally appear in the fiber-reinforced resin layer 52. Therefore, in the pressure testing method of the present embodiment, the internal pressure of the high-pressure tank 50, which has once been increased to the pressure resistance test pressure, is increased to the test pressure that is lower than the pressure resistance test pressure, and if AE waves are generated, the AE sensor 3 detects the AE waves and a plurality of AE waveforms is extracted from the output waveforms of the AE sensor 3, thereby facilitating the determination whether the high-pressure tank 50 is deteriorated based on the extracted AE waveforms. As a result, whether to replace the high-pressure tank 50 can be easily recognized.

As described above, when the cumulative number of the AE waveforms reaches or exceeds the first threshold, the high-pressure tank 50 is determined to be deteriorated. Pressurization of a deteriorated high-pressure tank 50 triggers a larger number of cracks in the fiber-reinforced resin layer, and the AE waveforms extracted from the output waveforms of the AE sensor increase accordingly. When the cumulative number of the AE waveforms reaches or exceeds a given value (first threshold), the high-pressure tank 50 is more likely to be deteriorated. Thus, whether the high-pressure tank 50 is deteriorated can be more accurately determined using the cumulative number of the AE waveforms.

Second Embodiment

The second embodiment describes a case where, unlike the first embodiment, the plurality of AE waveforms extracted by the extractor 121 is classified into the first waveforms derived from macrocracks and the second waveforms derived from microcracks smaller than the macrocracks.

Figure 7:
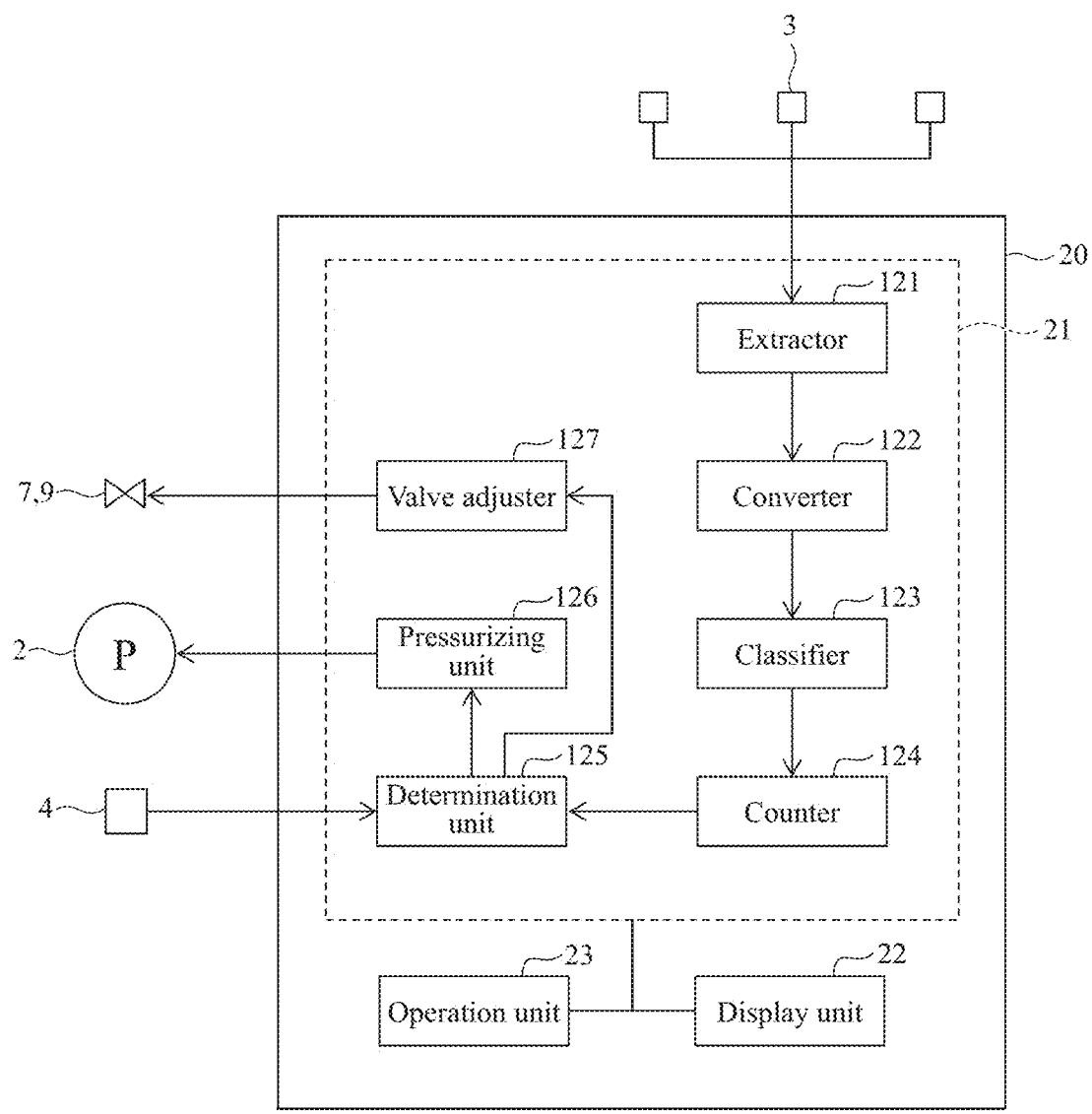
FIG. 7 is a block diagram showing the configuration of a controller of a pressure tester according to a second embodiment of the present disclosure.

In the present embodiment, as shown in FIG. 7, the controller 21 of the pressure tester 20 further includes a converter 122 and classifier 123, as software, in addition to the extractor 121, counter 124, determination unit 125, pressurizing unit 126, and valve adjuster 127. In the present embodiment, the extractor 121, counter 124, determination unit 125, converter 122, and classifier 123 constitute the "calculation device" of the present disclosure.

The extractor 121 sequentially extracts a plurality of AE waveforms from the output waveforms of the AE sensor 3 and outputs them to the converter 122.

When the AE waveforms derived from the plurality of AEs are connected to be output as one large (long in the time axis) AE waveform, such waveforms cannot be accurately classified by the classifier 123, which will be described later. Therefore, after the amplitude reaches or exceeds predetermined amplitude, when the amplitude is not reduced to less than the predetermined amplitude after the elapse of a given period of time, the AE waveforms are not classified by the classifier 123.

Each AE waveform extracted by the extractor 121 is the first waveform derived from the occurrence of macrocracks that increase immediately before the destruction of the high-pressure tank 50 or the second waveform derived from the occurrence of microcracks smaller than the macrocracks. It is possible to determine the state of deterioration of the high-pressure tank 50 using the number of the AE waveforms without classifying the AE waveforms into the first waveforms and second waveforms as in the first embodiment, but in the present embodiment, the state of deterioration of the high-pressure tank 50 can be more accurately determined by using the number of the first waveforms derived from the occurrence of macrocracks among the AE waveforms.

When the AE waveforms are classified into the first waveforms and second waveforms after performing a frequency analysis on the AE waveforms, the AE waveforms can be more accurately classified into the first waveforms and second waveforms. Therefore, in the present embodiment, the extracted AE waveforms are frequency-analyzed by the converter 122, and then classified into first images (first waveforms) and second images (second waveforms).

Macrocracks increase immediately before destruction of a high-pressure tank, and due to the increase of the macrocracks, the high-pressure tank becomes deteriorated, eventually leading to its destruction. Microcracks are shorter in length than macrocracks. A macrocrack is formed by connecting a plurality of microcracks. While microcracks occur from a state without cracks, macrocracks are formed by connecting a plurality of microcracks. In this way, the formation processes of them are different, and so the AE waves generated with occurrence of both cracks seem to have a difference. The length of a macrocrack is often 0.1 mm or more due to the connection of a plurality of microcracks. To acquire teaching data described later, less than 0.1 mm is defined as a microcrack, and 0.1 mm or more is defined as a macrocrack.

Figure 8:
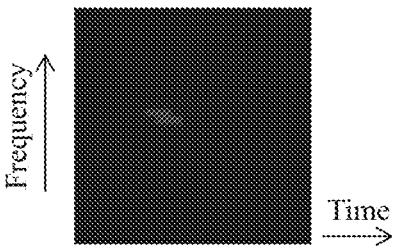
FIG. 8 shows an example of teaching data that is used when a classifier of the pressure tester according to the second embodiment of the present disclosure is machine-learned.
Figure 8:
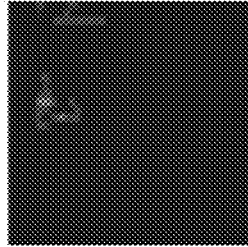
Figure 8:
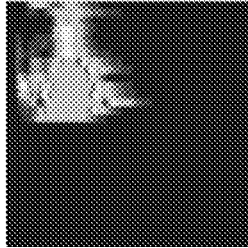
Figure 8:
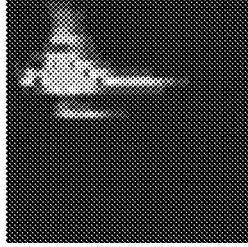

The converter 122 sequentially performs time-frequency analysis on the AE waveform input from the extractor 121. The converter 122 in the present embodiment wavelet-transforms the AE waveform to create an image (scalogram) as shown in FIG. 8. The horizontal axis of the images (scalograms) shown in FIG. 8 indicates time, the vertical axis indicates frequency, and the color (density) indicates intensity. Wavelet transformation is a frequency analysis using a wavelet function as a basis function. The wavelet transformation calculates the frequency characteristics while leaving the temporal information, unlike the Fourier transform. The wavelet transformation is defined by the following equation (1).

$$WT(b, a) = \frac{1}{\sqrt{|a|}} \int_{-\infty}^{\infty} f(t) \overline{\psi\left(\frac{t-b}{a}\right)} dt \quad (1)$$

In equation (1), a is the scale parameter, b is the shift parameter, and $\Psi(t)$ is the mother wavelet. Since the wavelet transformation itself is a known technique, detailed description thereof will be omitted.

The classifier 123 uses a support vector machine as a machine learning algorithm. The classifier 123 is machine-learned in advance so as to classify the output (image) of the converter 122 into a first image corresponding to the first waveform derived from macrocracks that increase immediately before destruction of the high-pressure tank 50, or a second image corresponding to the second waveform derived from microcracks. The classifier 123 outputs the classified first images and second images to the counter 124. The machine learning method of the classifier 123 will be described later.

The counter 124 counts the numbers of the first images and the second images, and outputs the resultant to the determination unit 125. The counter 124 may also be able to count the number of the AE waveforms extracted by the extractor 121, if necessary.

The determination unit 125 determines whether the high-pressure tank 50 is deteriorated, on the basis of the number of the first images (in other words, the number of generated macrocracks). In the present embodiment, the determination unit 125 determines whether or not the cumulative number of the first images is equal to or greater than a predetermined threshold. The method for determining the predetermined threshold will be described later.

When the cumulative number of the first images is equal to or greater than the predetermined threshold, the determination unit 125 determines that the high-pressure tank 50 is deteriorated, and that it has failed the test. At this time, the determination unit 125, similarly to the first embodiment, outputs a stop signal and a valve driving signal to the pressurizing unit 126 and the valve adjuster 127, respectively.

Other configurations of the test system 1 and the pressure tester 20 of the second embodiment are the same as those of the first embodiment.

Next, the following describes a method for machine learning of the classifier 123.

In this embodiment, as shown in FIG. 8, the classifier 123 is machine-learned using teaching data, in which images (scalograms) and types of cracks (macrocracks, microcracks) are associated. The moment when a crack occurs cannot be visually captured. It is therefore necessary to confirm that the first images correspond to the macrocracks and the second images correspond to the microcracks.

Figure 9:
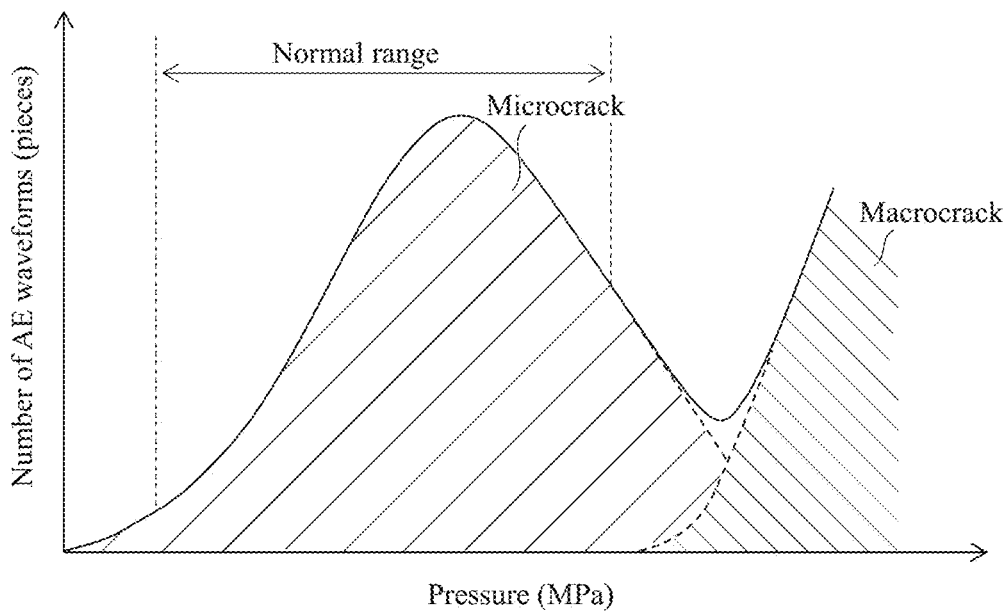
FIG. 9 conceptually shows the state of occurrence of microcracks and macrocracks when a high-pressure tank is pressurized.

Then, a method of acquiring teaching data to be used for machine learning is described first. FIG. 9 conceptually shows the state of occurrence of microcracks and macrocracks when a high-pressure tank that is unpressurized (before the pressure resistance test) is pressurized. FIG. 9 shows the number of cracks generated every time when the internal pressure of the high-pressure tank increases by a predetermined pressure. As shown in FIG. 9, when the pressure inside the high-pressure tank 50 increases, microcracks and macrocracks occur in the fiber-reinforced resin layer 52. In the relatively low range of the internal pressure of the high-pressure tank 50 (for example, several tens of MPa), microcracks occur, while macrocracks rarely occur. As the internal pressure of the high-pressure tank 50 increases, the number of macrocracks increases, and then the high-pressure tank 50 breaks.

The internal pressure of the high-pressure tank 50 for learning was increased to a first pressure (for example, several tens of MPa), and the plurality of AE waveforms obtained was wavelet-transformed to create a plurality of images. The created plurality of (for example, several tens or more) images was classified into two. Here, they were classified into images having a large difference in intensity (color density) (hereinafter referred to as first images) and images having a small difference in intensity (color density) (hereinafter referred to as second images). The actual classification in this way showed that the number of the second images was larger than the number of the first images, and the proportion of the second images was 95% or more.

After increasing the internal pressure of the high-pressure tank 50 to the first pressure, the pressurization of the high-pressure tank 50 was stopped, and the cross section of the fiber-reinforced resin layer 52 of the high-pressure tank 50 was observed. Actual observation of the cross section showed that microcracks and macrocracks were formed in the fiber-reinforced resin layer 52. The number of microcracks was 95% or more of the total number of cracks (total of microcracks and macrocracks). This suggests that the first images correspond to the macrocracks and the second images correspond to the microcracks.

The internal pressure of another high-pressure tank 50 for learning was increased to a second pressure (for example, a hundred and several tens of MPa), and images were created in the same manner as described above. Then, the plurality of created images (for example, several tens or more) was classified into two. The actual classification in this way showed that the proportion of the number of the first images increased compared to the case of increasing the internal pressure of the high-pressure tank 50 to the first pressure. The number of the AE waveforms extracted from the output waveforms of the AE sensor 3 (i.e., the number of the AEs generated in the high-pressure tank 50) also increased compared to the case of increasing the internal pressure of the high-pressure tank 50 to the first pressure.

The cross section of the fiber-reinforced resin layer 52 was observed in the same manner as when the pressure was increased to the first pressure. The actual observation of the cross section showed that the number of macrocracks increased compared to the case of increasing the internal pressure to the first pressure.

The internal pressure of another high-pressure tank 50 for learning was increased until the high-pressure tank 50 broke. Images were created from the output waveforms of the AE sensor 3 immediately before destruction in the same manner as described above, and the created plurality of images (for example, several tens or more) was classified into two. The actual classification in this way showed that the proportion of the number of the first images further increased compared to the case of increasing the internal pressure of the high-pressure tank 50 to the second pressure. The number of the AE waveforms extracted from the output waveforms of the AE sensor 3 (i.e., the number of the AEs generated in the high-pressure tank 50) also increased compared to the case of increasing the internal pressure of the high-pressure tank 50 to the second pressure.

The cross section of the fiber-reinforced resin layer 52 was observed in the same manner as when the pressure was increased to the second pressure. The actual observation of the cross section showed that the number of macrocracks further increased compared to the case of increasing the internal pressure to the second pressure.

From the above, the first images correspond to the macrocracks and the second images correspond to the microcracks. The data as shown in FIG. 8 with the first images (macrocracks) and the second images (microcracks) associated was prepared as the teaching data.

Next, the classifier 123 was machine-learned using this teaching data. Specifically, the classifier 123 was machine-learned using 250 out of 300 teaching data as training data so as to classify images into first images derived from macrocracks and second images derived from microcracks. Next, the classifier 123 tried to classify images into first images and second images using the remaining 50 of the 300 teaching data as evaluation data. The result showed that the correct answer rate by the classifier 123 was 70% or more, and the classification accuracy was sufficiently high. In this way, the classifier 123 was machine-learned.

Next, a method for determining the predetermined threshold is described below. The method for determining the predetermined threshold is the same as that for determining the first threshold in the first embodiment.

Figure 10:
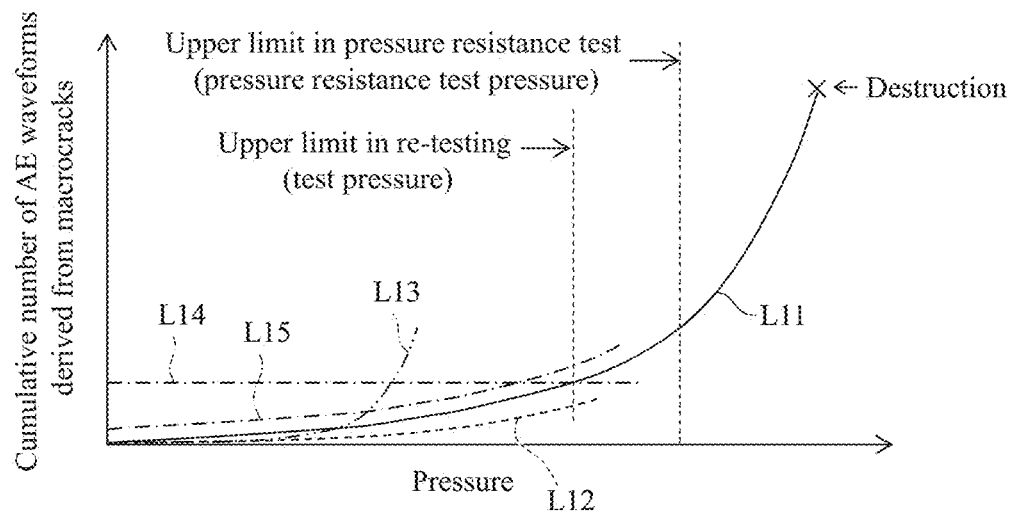
FIG. 10 shows the cumulative number of AE waveforms derived from macrocracks when a high-pressure tank is pressurized.

Specifically, as indicated by the solid line L11 in FIG. 10, when the internal pressure of the high-pressure tank 50 that is unpressurized (before the pressure resistance test) is increased until the high-pressure tank 50 breaks, the number of the AEs (the number of the AE waveforms) generated in the high-pressure tank 50 also increases. In particular, the number of the AE waveforms derived from macrocracks gradually increases as the internal pressure of the high-pressure tank 50 increases. This number sharply increases immediately before the destruction of the high-pressure tank 50.

As described above, when the internal pressure of the high-pressure tank 50 after undergoing the pressure resistance test is increased to a pressure that is lower than the upper limit (pressure resistance test pressure) of the pressure at the time of the pressure resistance test, few macrocracks are normally generated in the fiber-reinforced resin layer. Therefore, the cumulative number of the AE waveforms derived from macrocracks does not exceed the solid line L11, as indicated by the dotted line L12 in FIG. 10. On the other hand, when the internal pressure of the high-pressure tank 50 is increased to a pressure that is lower than the pressure at the time of the pressure resistance test, if the cumulative number of the AE waveforms derived from macrocracks exceeds the solid line L11 (at the time of the pressure resistance test), as indicated by the two-dot chain line L13 in FIG. 10, this is an indication of the occurrence of abnormality in the high-pressure tank 50, which enables easy determination whether the high-pressure tank 50 is deteriorated. The predetermined threshold as a reference for the determination may be a constant value as indicated by the reference line L14 in FIG. 10 or a value slightly greater than the cumulative number (solid line L11 in FIG. 10) at the time of the pressure resistance test as indicated by the reference line L15. The predetermined threshold is set by measuring the cumulative numbers of the AE waveforms of a plurality of high-pressure tanks 50 until their destruction (solid line L11 in FIG. 10) while considering the variations.

When measuring the cumulative number of the AE waveforms derived from macrocracks, all AE waveforms extracted by the extractor 121 may be converted into images by the converter 122, and the images may be classified into the first images and the second images by the classifier 123. However, tens of thousands of AE waveforms are extracted every time when the internal pressure of the high-pressure tank 50 increases by 5 MPa. It is therefore not easy to convert and classify all of the AE waveforms. Then, a predetermined number (for example, 100) may be selected from the AE waveforms extracted by the extraction unit 121, and the predetermined number of the AE waveforms (for example, 100) may be converted and classified to calculate the proportions of the first images and the second images.

The cumulative number of the AE waveforms derived from macrocracks may be calculated from the proportion of the first images and the total number of the AE waveforms extracted by the extractor 121.

Figure 11:
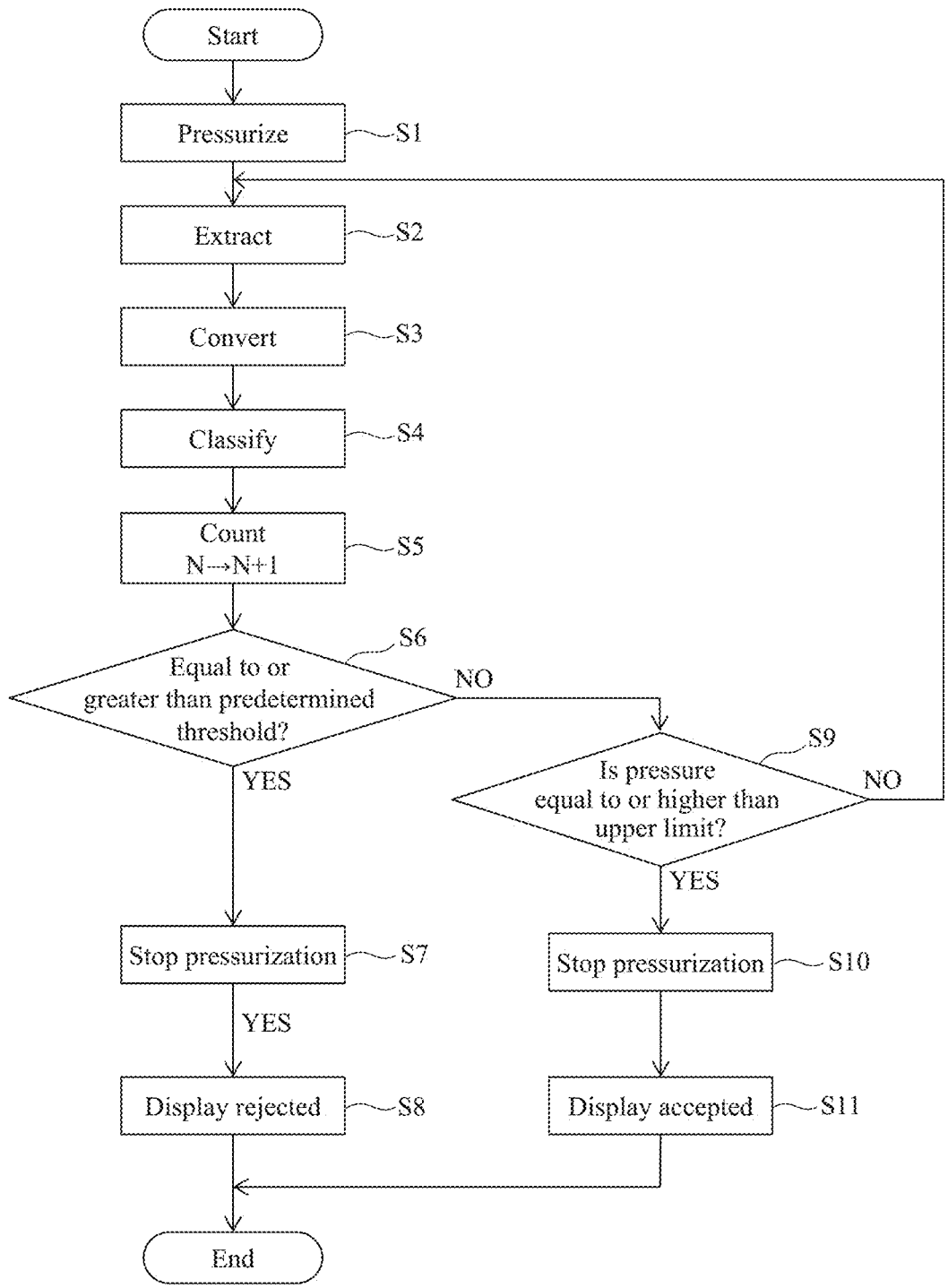
FIG. 11 is a flowchart of a pressure testing method according to the second embodiment of the present disclosure.

Next, with reference to FIG. 11, the pressure testing method for the high-pressure tank 50 using the pressure tester 20 in the present embodiment will be described.

Step S1 and step S2 are the same as those of the first embodiment.

At step S3, the converter 122 wavelet-transforms the AE waveforms input from the extractor 121 to sequentially create images (scalograms). The converter 122 outputs the created images to the classifier 123.

At step S4, the classifier 123 classifies the output (images) of the converter 122 into first images corresponding to the first waveforms and second images corresponding to the second waveforms. The classifier 123 outputs the classified first images and second images to the counter 124.

At step S5, the counter 124 counts (adds 1 to N) the numbers of the first images and the second images that are sequentially input from the classifier 123. The counter 124 outputs the counted numbers of the first images and the second images to the determination unit 125.

At step S6, the determination unit 125 determines whether or not the cumulative number of the first images is equal to or greater than a predetermined threshold.

When the cumulative number of the first images is equal to or greater than the predetermined threshold, i.e., when the high-pressure tank 50 is in a state of deterioration, the determination unit 125 outputs a stop signal to stop the pressurization of the high-pressure tank 50 and a valve driving signal to the pressurizing unit 126 and the valve adjuster 127, respectively. Then, the procedure proceeds to step S7. Step S7 and step S8 are the same as those of the first embodiment.

Meanwhile, at step S6, when the cumulative number of the first images is less than the predetermined threshold, that is, when the high-pressure tank 50 is not in a state of deterioration, the procedure proceeds to step S9. Step S9 to step S11 are the same as those of the first embodiment.

Then, the pressure test for the high-pressure tank 50 ends.

Other part of the pressure testing method of the present embodiment is the same as that of the first embodiment.

In the present embodiment, as described above, using the classifier 123 that is machine-learned so as to classify a plurality of extracted AE waveforms into first waveforms derived from macrocracks that increase immediately before destruction of the high-pressure tank 50 and second waveforms derived from microcracks smaller than the macrocracks, the plurality of extracted AE waveforms is classified into the first waveforms and second waveforms, and whether the high-pressure tank 50 is deteriorated is determined on the basis of the number of the first waveforms classified. This enables determination whether the high-pressure tank 50 is deteriorated based on the number of the first waveforms derived from macrocracks that increase immediately before destruction of the high-pressure tank 50, and thus, whether the high-pressure tank 50 is deteriorated can be more accurately determined.

As described above, the extracted AE waveforms are wavelet-transformed to create images (scalograms) indicative of a temporal change in the frequency components. The classifier 123 classifies the created plurality of images into first images and second images easily, which enables easy determination whether the high-pressure tank 50 is deteriorated.

The other advantageous effects of the present embodiment are the same as those of the first embodiment.

The embodiments disclosed here are to be considered in all respects as illustrative and not restrictive. The scope of the present disclosure is defined by the claims and not by the embodiments, and is intended to include any modification within the meaning and scope equivalent to the terms of the claims.

For example, the aforementioned embodiments describe that a plurality of AE waveforms is extracted from output waveforms of the AE sensor while the high-pressure tank is pressurized, so that whether the high-pressure tank is deteriorated is determined, but the present disclosure is not limited thereto, and may pressurize the high-pressure tank and determine the deterioration separately. Specifically, while the high-pressure tank is pressurized to reach the upper limit of a test pressure, the AE sensor detects AE waves, and the output waveforms of the AE sensor are stored, and then the pressure of the high-pressure tank is decreased. Subsequently, a plurality of AE waveforms is extracted from the stored output waveforms of the AE sensor to determine whether the high-pressure tank is deteriorated.

Figure 12:
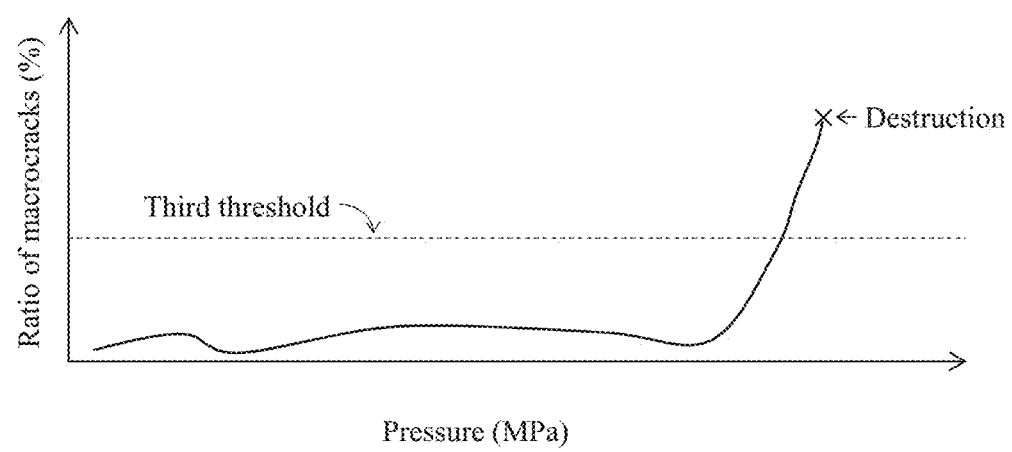
FIG. 12 shows the ratio of the number of macrocracks to the numbers of microcracks and macrocracks generated when a high-pressure tank is pressurized.

The first embodiment describes an example in which the high-pressure tank is determined to be in a deteriorated state when the cumulative number of the AE waveforms reaches or exceeds the first threshold, but the present disclosure is not limited thereto. For example, since in a deteriorated high-pressure tank, the increasing rate of the AE waveforms to the increase amount of pressure (that is, the slope of the solid line L1 in FIG. 5) increases, when the increasing rate of the AE waveforms to the increase amount of pressure in the high-pressure tank is equal to or greater than a second threshold, the high-pressure tank may be determined to be deteriorated. This applies to the increasing rate of the AE waveforms derived from macrocracks (that is, the slope of the solid line L11 in FIG. 10) in the second embodiment. As shown in FIG. 12, the ratio of the number of macrocracks generated to the number of microcracks and macrocracks generated increases sharply, when the deterioration of the high-pressure tank develops. Thus, when the ratio of the first waveforms to the sum of the first waveforms and the second waveforms is equal to or greater than a third threshold, the high-pressure tank may be determined to be deteriorated. In either case, whether the high-pressure tank is deteriorated can be determined, which enables to surely prevent the destruction of the high-pressure tank. Two or more of the cumulative number of the AE waveforms, the cumulative number of the first waveforms, the increasing rate of the first waveforms to the increase amount of pressure, and the ratio of the first waveforms may be used in combination, and when any one of them exceeds the threshold, the high-pressure tank may be determined to be deteriorated.

The second embodiment describes the example of wavelet-transforming AE waveforms, and the present disclosure is not limited to this. AE waveforms may be converted by other methods, including fast Fourier transform, short-time Fourier transform, and Wigner distribution.

The second embodiment describes an example in which when a plurality of AE waveforms is classified into first waveforms and second waveforms, the AE waveforms are wavelet-transformed to create images (scalograms) and the images are classified into first images and second images. However, the present disclosure is not limited thereto, and may classify the AE waveforms into first waveforms and second waveforms without performing wavelet transformation. The reason is as follows. In the second embodiment, since the high-pressure tank is filled with gas, the AE waves (vibrations) generated when AEs occur in the high-pressure tank propagate through the fiber-reinforced resin layer to be detected by the AE sensor. Specifically, unlike a case in which the high-pressure tank is filled with liquid, the AE waves (vibrations) do not propagate through both the fiber-reinforced resin layer and the liquid. Thus, the AE waves reflected at the interface between the liquid and the liner when propagating through the liquid or overlapping waves propagating through the fiber-reinforced resin layer and the liquid are not generated. This allows the AE waveforms to be classified into first waveforms and second waveforms without performing wavelet transformation.

The first embodiment describes an example in which whether the high-pressure tank is deteriorated is determined, on the basis of the number of the AE waveforms. However, the present disclosure is not limited thereto, and may also be configured, for example, so as to determine that the high-pressure tank is deteriorated when the AE waveforms having significantly large amplitude (amplitude greater than a given value) are extracted, regardless of the number of the AE waveforms.

The above embodiments describe the example of using a support vector machine as a machine learning algorithm of the classifier, and the present disclosure is not limited to this. In one example, another machine-learning algorithm, including k-means method, VAE (Variational Auto Encoder), CNN (Convolutional Neural Network), GAN (Generative Adversarial Network), Bayesian filter, or isolation forest, may be used for classification.

What is claimed is:

1. A pressure testing method adapted to test a high-pressure tank that includes a liner and a fiber-reinforced resin layer covering an outer surface of the liner and that has been used while repeating charge and discharge of gas to and from an inside thereof after undergoing a pressure resistance test conducted at a pressure resistance test pressure, the pressure testing method comprising:
   increasing an internal pressure of the high-pressure tank filled with gas to a test pressure that is lower than the pressure resistance test pressure, so that a plurality of AE waveforms is extracted from output waveforms of an AE sensor that detects AE waves generated when cracks occur in the high-pressure tank;
   determining whether the high-pressure tank is deteriorated, on the basis of the AE waveforms extracted; and
   classifying the plurality of AE waveforms extracted into first waveforms derived from macrocracks that increase immediately before destruction of the high-pressure tank and second waveforms derived from microcracks smaller than the macrocracks with a classifier that is machine-learned so as to classify the plurality of AE waveforms extracted into the first waveforms and the second waveforms,
   wherein whether the high-pressure tank is deteriorated is determined on the basis of a number of the first waveforms classified.

2. The pressure testing method according to claim 1, wherein
   the plurality of AE waveforms extracted are wavelet-transformed to create a plurality of images, the plurality of images corresponding to the plurality of AE waveforms is classified into first images corresponding to the first waveforms and second images corresponding to the second waveforms with the classifier that is machine-learned so as to classify the plurality of images into the first images and the second images, and
   whether the high-pressure tank is deteriorated is determined on the basis of a number of the first images classified.

3. The pressure testing method according to claim 1, wherein when a cumulative number of the AE waveforms reaches or exceeds a threshold, the high-pressure tank is determined to be deteriorated.

4. A pressure tester adapted to test a high-pressure tank that includes a liner and a fiber-reinforced resin layer covering an outer surface of the liner and that has been used while repeating charge and discharge of gas to and from an inside thereof after undergoing a pressure resistance test conducted at a pressure resistance test pressure, the pressure tester comprising a calculation device, wherein
   the calculation device includes:
      an extractor that extracts a plurality of AE waveforms from output waveforms of an AE sensor that detects AE waves generated when cracks occur in the high-pressure tank by increasing an internal pressure of the high-pressure tank filled with gas to a test pressure that is lower than the pressure resistance test pressure,
      a determination unit that determines whether the high-pressure tank is deteriorated, on the basis of the AE waveforms extracted by the extractor, and
      a classifier that is machine-learned so as to classify the plurality of AE waveforms extracted by the extractor into first waveforms derived from macrocracks that increase immediately before destruction of the high-pressure tank and second waveforms derived from microcracks smaller than the macrocracks,
      wherein the determination unit determines whether the high-pressure tank is deteriorated, on the basis of a number of the first waveforms classified by the classifier.

5. The pressure tester according to claim 4, wherein
   the calculation device includes a converter that wavelet-transforms the plurality of AE waveforms extracted by the extractor to create a plurality of images,
   the classifier is machine-learned so as to classify the plurality of images corresponding to the plurality of AE waveforms into first images corresponding to the first waveforms and second images corresponding to the second waveforms, and
   the determination unit determines whether the high-pressure tank is deteriorated, on the basis of a number of the first images classified by the classifier.

6. The pressure tester according to claim 4, wherein the determination unit determines that the high-pressure tank is deteriorated when a cumulative number of the AE waveforms reaches or exceeds a threshold.

* * * * *